(12) United States Patent
Etherington et al.

(10) Patent No.: US 6,195,868 B1
(45) Date of Patent: Mar. 6, 2001

(54) CONVEYOR BELT WITH IMPROVED ROD TO LINK ATTACHMENT

(75) Inventors: Michael Etherington, Winchester; William F. Funkhouser, Mount Jackson; Marshall L. Veach, Winchester, all of VA (US)

(73) Assignee: Ashworth Bros., Inc., Fall River, MA (US)

( * ) Notice: Subject to any disclaimer, the term of this patent is extended or adjusted under 35 U.S.C. 154(b) by 0 days.

(21) Appl. No.: 09/303,576

(22) Filed: May 3, 1999

Related U.S. Application Data (62) Division of application No. 08/995,424, filed on Dec. 19, 1997, now Pat. No. 6,070,715.

(51) Int. Cl.⁷ .................................................. B21D 39/00
(52) U.S. Cl. ........................ 29/522.1; 198/848; 29/523
(58) Field of Search ............... 59/31, 35.1; 198/848, 198/850; 29/509, 522.1, 523; 52/664, 665, 667, 669

(56) References Cited

U.S. PATENT DOCUMENTS

| | | |
|---|---|---|
| 2,928,170 | 3/1960 | McLaughlin . |
| 3,261,451 | 7/1966 | Roinestad . |
| 3,831,257 * | 8/1974 | Boggs .................................. 59/31 X |
| 3,948,013 | 4/1976 | Lobaugh et al. . |
| 4,080,842 * | 3/1978 | Lapeyre . |
| 4,429,785 | 2/1984 | Dango . |
| 4,647,750 * | 3/1987 | Mosbacher . |
| 4,941,568 * | 7/1990 | Lapeyre . |
| 4,971,191 | 11/1990 | Lapeyre . |
| 5,174,438 * | 12/1992 | Witham . |
| 5,271,491 | 12/1993 | Irwin . |
| 5,431,275 | 7/1995 | Faulkner . |
| 5,622,252 * | 4/1997 | Raum . |
| 5,645,160 * | 7/1997 | Palmaer et al. . |
| 5,906,270 * | 5/1999 | Faulkner . |
| 5,954,187 | 9/1999 | Hager . |
| 5,954,188 * | 9/1999 | Etherington . |
| 6,036,002 | 3/2000 | Kobayashi et al. . |

FOREIGN PATENT DOCUMENTS

| | | |
|---|---|---|
| 0 456 145 | 11/1991 | (EP) . |
| 0 642 997 | 3/1995 | (EP) . |
| 2 137 948 | 10/1984 | (GB) . |

OTHER PUBLICATIONS

European Search Report dated Sep. 24, 1998 from European Patent Application No. 98.201929.1.
P. 474 from Merriam Webster's collegiate Dictionary, 1997.

* cited by examiner

Primary Examiner—S. Thomas Hughes
Assistant Examiner—Steven A Blount
(74) Attorney, Agent, or Firm—Banner & Witcoff, Ltd.

(57) ABSTRACT

A conveyor belt with rods and connective links that engage one another so as to resist lateral and rotational movement about the rods during conveyor operation. The links are affixed on the rods by resistance welding the rod to the link apertures. In addition to the resistance weld, the rods include diametrically enlarged protrusions or swells that are placed proximate the link apertures to constrain the links from lateral movement on the rod. At the ends of the rod, this protrusion is in the form of an upset or button head. Alternative embodiments also include rotational constraints of the links relative to the rod. The additional fixation steps such as manual welding used in conventional belt manufacture are thus eliminated. By affixing the links and rods together in the manner disclosed, repeated movements of the link legs relative to the rods are eliminated thereby significantly reducing the chances of fatigue failure of the links.

9 Claims, 10 Drawing Sheets

CONVEYOR BELT WITH IMPROVED ROD TO LINK ATTACHMENT

This application is a division of U.S. application Ser. No. 08/995,424, filed Dec. 19, 1997, now U.S. Pat. No. 6,070,715.

FIELD OF THE INVENTION

The present invention relates to conveyor belts generally comprising a support surface, and connective rods and connective links which are affixed to one another without manual welding as is necessary with conventional components and assembly methods.

BACKGROUND OF THE INVENTION

Wire and plastic conveyor belt systems are widely used in a great variety of industrial fields. A wire mesh or plastic overlay can be used with the rods to provide a support surface of a conveyor belt. The wire or plastic components of the overlay are intermeshed together by connecting rods which extend transversely across the width of the belt. Typically the intermeshed overlay components are connected to one another by the connecting rods. Alternatively, the support surface provided by the rods can be used without an overlay. The ends of the rods are inserted into connective links and the rods and links are welded together. The connective links may serve as tractive links around a sprocket wheel.

Figure 16:
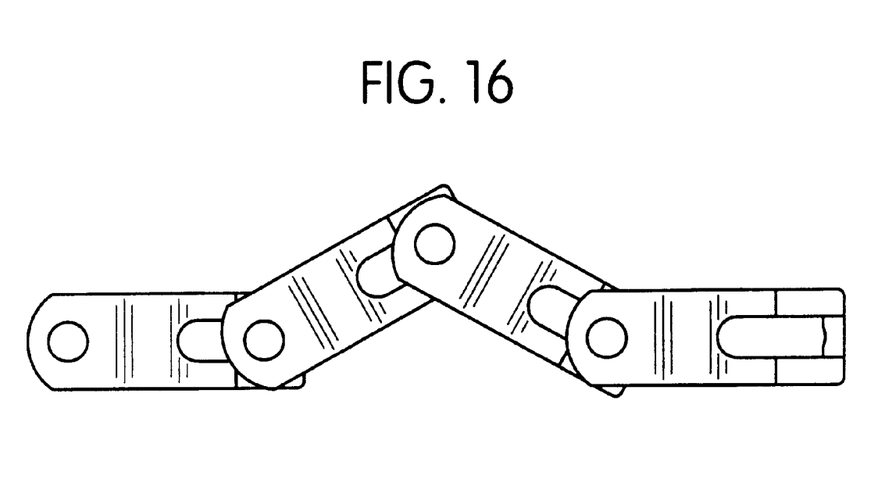
FIG. 16 is a side elevational view of a series of connective links, two of which have tented by moved rotationally relative to the rods.

In conventional conveyor belts, a weld is typically placed at the exterior sides of the link legs to attach the link to the rod. This weld serves two purposes. Firstly, it achieves positive fixation of the link to the outermost portion of the rod. This is important because the connective links at the outer edges of a belt are used for driving interface with the drive sprockets so that any transverse or lateral movement of the connective link along the rod will result in misalignment with the sprockets. This will lead to damage to the sprockets, belt and the system. Secondly, the weld prohibits the connective links from rotational movement that leads to "tenting" of the link on the rod. Tenting refers to the rotational movement of the link relative to the rod when the rods move together causing a link to tilt upward about its rod apertures, and is illustrated schematically in FIG. 16. This movement normally occurs on the inside edge of the belt during its collapsed state of operation in a spiral system, and causes the belt to jam during operation resulting in belt and system damage, as well as downtime.

The weld holding the link to the rod is a main area of perceived failure and real failure for conveyor belts since the weld is subjected to numerous stresses during operation. The biggest contributors to weld failures include normal fatigue caused by belt tensions above the allowable limit including lateral deflection of the legs of the connective links and rod buckling. These stresses on the links cause cracks to form in the welds. Even after a weld fails, however, it continues to function to hold the connective links in a fixed position which allows the belt to operate. It has been observed that the weld deposits on the rod act as barriers that trap the connective link in place allowing for proper sprocket and drive engagement. In addition, while tenting has been observed where welds have failed, in general the ragged edges of the fractured welds continue to prevent rotational movement of the connective link.

A conveyor belt with fractured welds is acceptable and operational as long as the system is running under allowable tension limits, however, the problem of perceived failure of the belt arises whenever some of the welds are cracked. Even though a belt with cracked welds is still able to function effectively under normal operating conditions, users who have been repeatedly warned by belt manufacturers that broken welds are precursors to real failure have perceived the broken welds as a failure in and of themselves. There has been a need to structurally affix the links on the rods to prevent their rotation about the rods. This engagement would eliminate this perceived problem with conventional belts that raises user complaints and warranty issues.

Besides showing the first signs of fatigue stress, the conventional welds between the links and rods also require a time-consuming manual welding step during manufacture. As can be seen from FIGS. 12–14, the conventional methods require that the connective links be individually welded to the rods. This step is inefficient and expensive.

In conveyor belts used to move consumable material through processing machinery, such as coating, freezing, cooking, etc., sanitation is a concern particularly in conveyor systems which present a variety of crevices into which the material can be deposited and spoil. In conventional conveyor systems, the belts must be cleaned periodically, particularly in the welded area.

Therefore, there exists a need for a conveyor belt with structural features that will eliminate the time consuming welding step and thereby eliminate perceived and real weld failure, decrease the chances of tenting of the links, and presents a conveying surface with less crevices for sanitary operating conditions. There also exists a need for streamlining the manufacture of conveyor belts by eliminating the current methods of attaching the connective links to the rods.

SUMMARY OF THE INVENTION

Accordingly, the present invention provides connective links and rods for a conveyor belt and its manufacture which overcomes many of the problems associated with the prior art.

The present invention pertains to a conveyor belt comprising rods that are resistance welded within the connective link apertures. During assembly, electrodes are applied to rods to provide the necessary energy for the rods to undergo a controlled deformation which results in the formation of an annular protrusion or swell. Such a protrusion is formed on either side of each leg of the link to constrain the link from lateral movement on the rod. At the ends of the rods, a similar process is used to form an upset or button head. In this way a button head can be thought of as a type of protrusion. By varying the position of an electrode on the rod during manufacture, the location of the protrusion can be chosen. The resistance weld and the protrusions constrain the link to the rod and eliminates the additional fixation steps used in conventional belt manufacture and simplifies production. In this manner, the conventional manual welds and their attendant problems such as fatigue cracks are eliminated altogether.

One aspect of the invention is the use of rods with stepped ends which provide for control of the expansion and swelling of the rod to fix the link onto the rod and prevent its lateral movement.

Another aspect of the invention is the use of rods of uniform diameter which can be made to swell into the desired shape and size by controlling the shape of the apertures and slots in the link, and by careful placement of the forming electrodes along the rod.

Yet another aspect of the present invention is that the button head and inside weld seals the rod-link interface eliminating any crevices between the rod and the aperture in the link which provides a more sanitary edge without the necessity for repeated cleaning of the belt.

An additional aspect of the present invention is the provision of a structural feature to prohibit rotational movement of the link relative to the rod and thus eliminate the tenting problem.

These and other features and advantages of the invention may be more completely understood from the following detailed description of the preferred embodiments of the invention with reference to the accompanying drawings.

DETAILED DESCRIPTION OF THE PREFERRED EMBODIMENT

Referring to the figures, the preferred embodiment of conveyor belt 10 with improved rod to link attachment is made up of rods 12 and connective links 22. An overlay 14 extends between the ends of the rods to provide a conveying surface. A wire mesh overlay is shown in the figures, but any suitable metal or plastic overlay may be used. The belt may also be used without an overlay.

In a first preferred embodiment, each rod 12 has a stepped area 16 between a large diameter central portion 18 and reduced diameter end portion 20. Stepped area 16 provides means to control expansion of the rod and the magnitude of such expansion when electrodes are applied to affix the rod and connective links.

Rods 12 are interconnected by connective links 22 generally having a U-shape with the legs being spaced apart so as to receive the cross-member of an adjacent link. Connective links 22 are provided with an aperture 24 in leg 26 and an aperture 28 in leg 30 for reception of a rod. In assembling belt 10, the links are placed so that legs 26 lay toward the inside of the belt, and legs 30 lay toward the outside of the belt. Therefore, legs 26 may herein be referred to as the inner legs, and legs 30 may be referred to as the outer legs of the connective links. Elongated apertures 36 are provided adjacent cross-member 34 on each leg 26 and 30. Elongated apertures 36 receive rods to allowing them to move therein enabling for collapse of the connective links relative to each other in an assembled belt. Collapse of the links into a nested arrangement occurs when the belt traverses a lateral curve.

Figure 10:
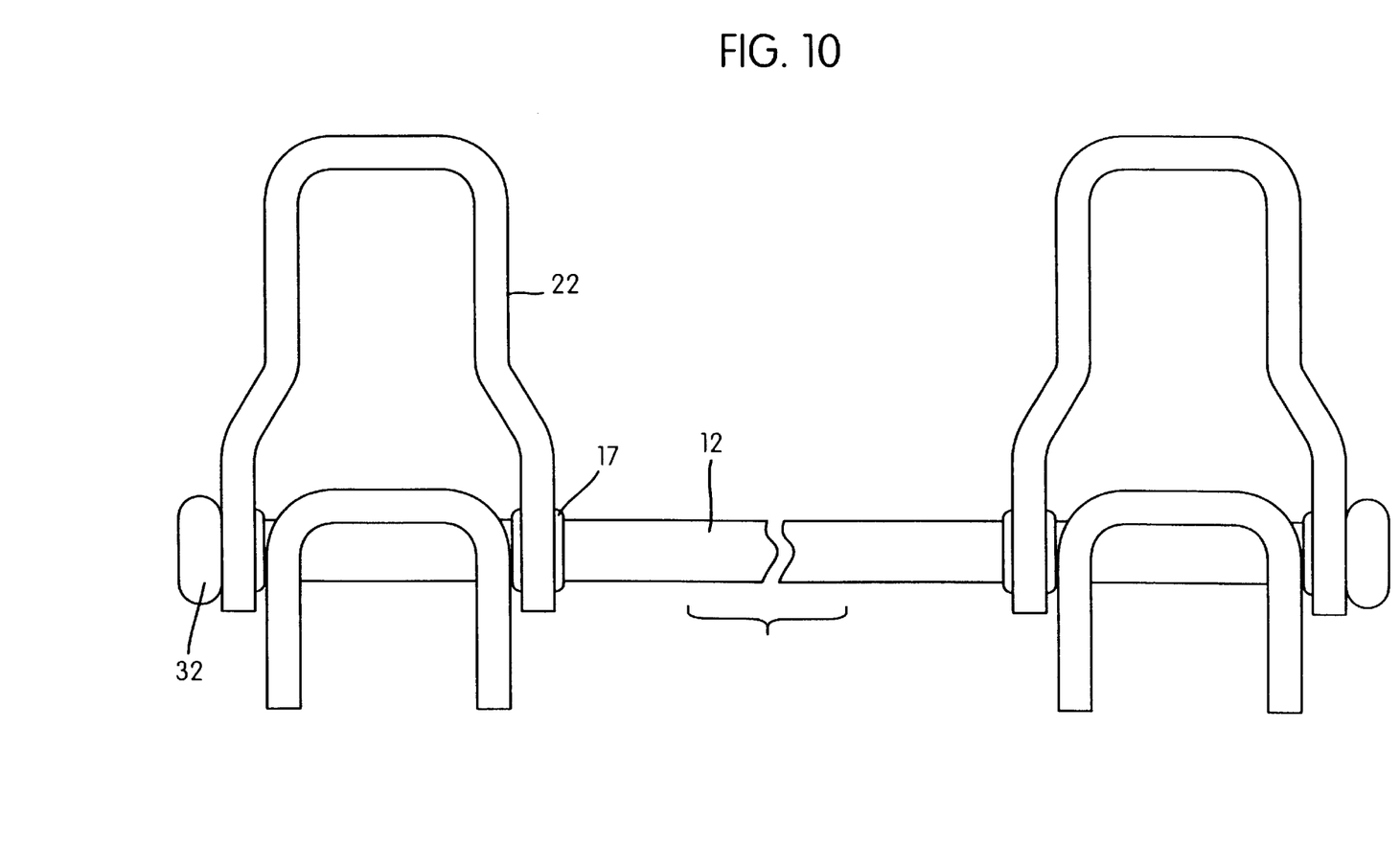
FIG. 10 is a detailed top plan view of a single rod of a belt section as shown in FIG. 2 shown assembled and attached to its connective links.

Stepped transition area 16 of rod 12 is preferably positioned just to the inside of outer leg 30 so that aperture 28 receives the reduced diameter portion 20 of the rod. The stepped area provides a means of controlling where rod 12 swells and a mount when electrodes are applied to the rod and link. Protrusion 17 ensures that the rod and connective link are affixed at aperture 28 as depicted in FIG. 10.

In a second preferred embodiment, formation of a protrusion can also be accomplished by variable control of electrode placement on rods that are not stepped, that is, on rods of uniform diameter. Depending upon such parameters as rod diameter and link size, electrodes can be placed so that a protrusion will form on the rod where it is desired.

Protrusion formation on either type of rod occurs because the link acts as a heat sink during manufacture. Upon application of the electrodes, the rod expands until it contacts the walls of the aperture. At that point in the expansion of the rod, the link absorbs heat thereby slowing the deformation of the rod to fuse the rod and link aperture together and form the protrusion or bulge. The protrusion is a controlled deformation of the rod at a desired location.

Figure 11:
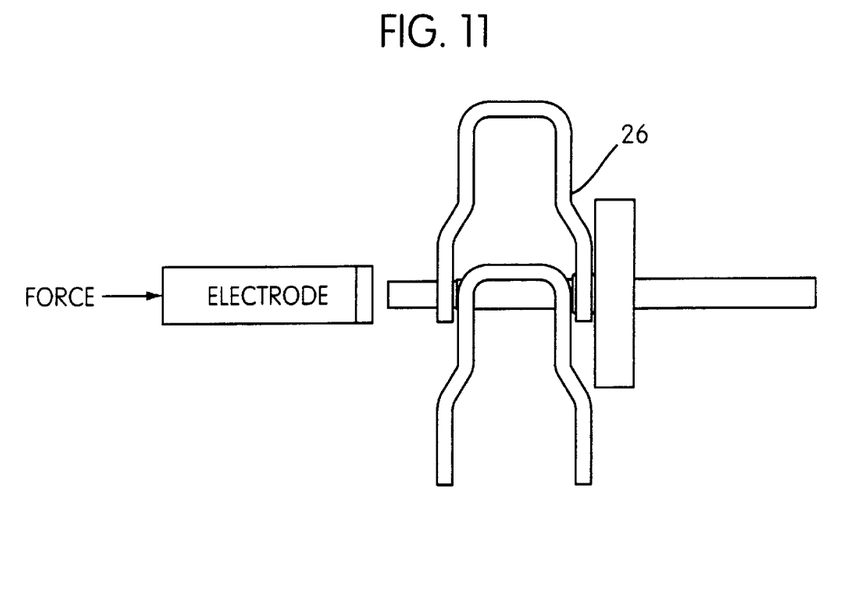
FIG. 11 is a schematic representation of the rod and connective link shown with the electrode placement for forming the protrusions at the inner link legs.
Figure 12:
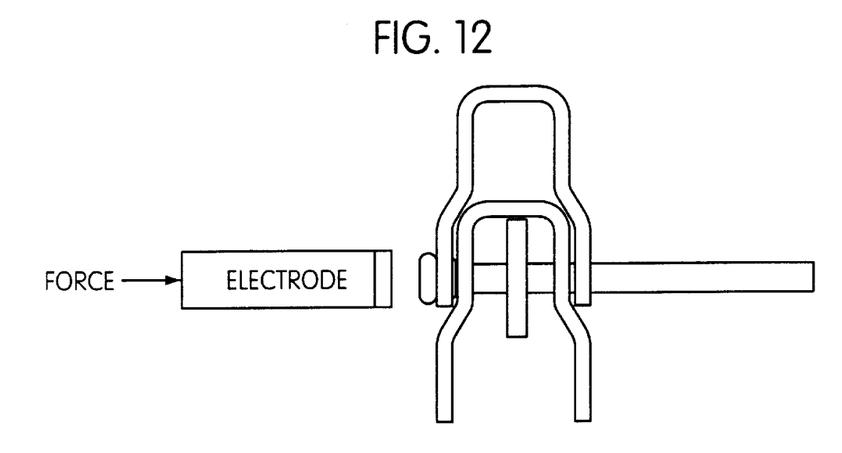
FIG. 12 is a schematic representation of the rod and connective link shown with the electrode placement for forming the protrusions at the outer link legs and button head.
Figure 13:
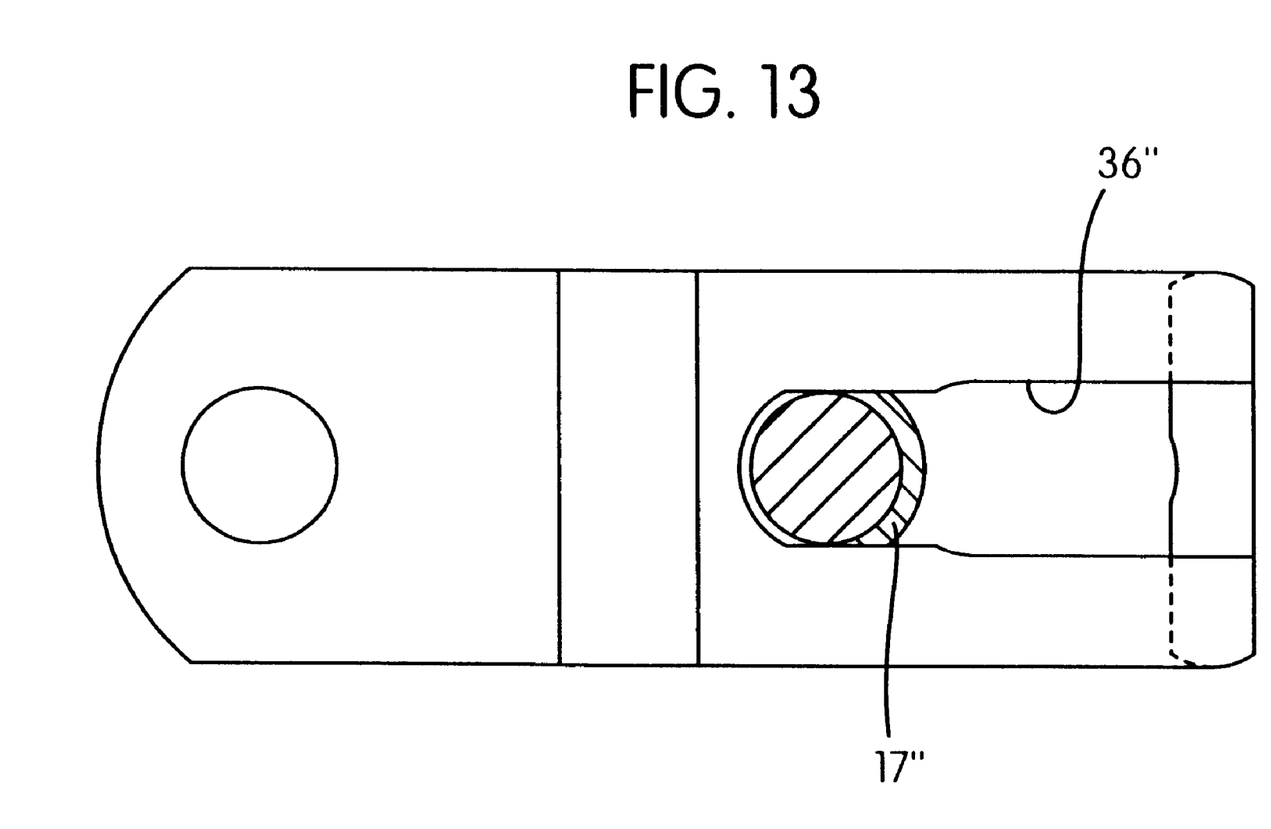
FIG. 13 is a side elevational view showing an alternative elongated aperture shown with a section of the rod.

The attachment of the rod and link are illustrated in FIGS. 11 and 12 where an electrode is placed at the end of rod and another placed adjacent inner leg 26. When the appropriate energy is applied, the rod and link are fused together in aperture 24 and deformation of the rod results in protrusion 17 to constrain inner link leg 26 from lateral movement on the rod. Electrodes are then placed on the inside of outer leg 30 and to the end of the rod outside of leg 30. Upon application of the appropriate energy, an upset or button head is formed at the end of the rod and the rod is simultaneously fused within aperture 28. Fusion of the rod in the apertures combined with positive placement of the link on the rod made possible by protrusion 17 eliminates the need for any additional steps of attaching the link and rod to one another by manual welding.

As a matter of example, two links 22 are assembled to a single rod in the nested manner shown, with this configuration repeated along the belt. The rod is received in the elongated aperture near the cross-member of one link as well as the aligned apertures on the legs of a neighboring link. In this manner, the rod can move relative to the first link (shown as the lower link) and is generally fixed in place with respect to the second link (shown as the upper link).

Constraining the link from movement relative to the rod in the lateral and rotational directions prevents the movements which result in fatigue stresses and failure in the prior art, and prevents the link from traversing inward on the rod, thus eliminating any additional manufacturing steps.

Figure 1:
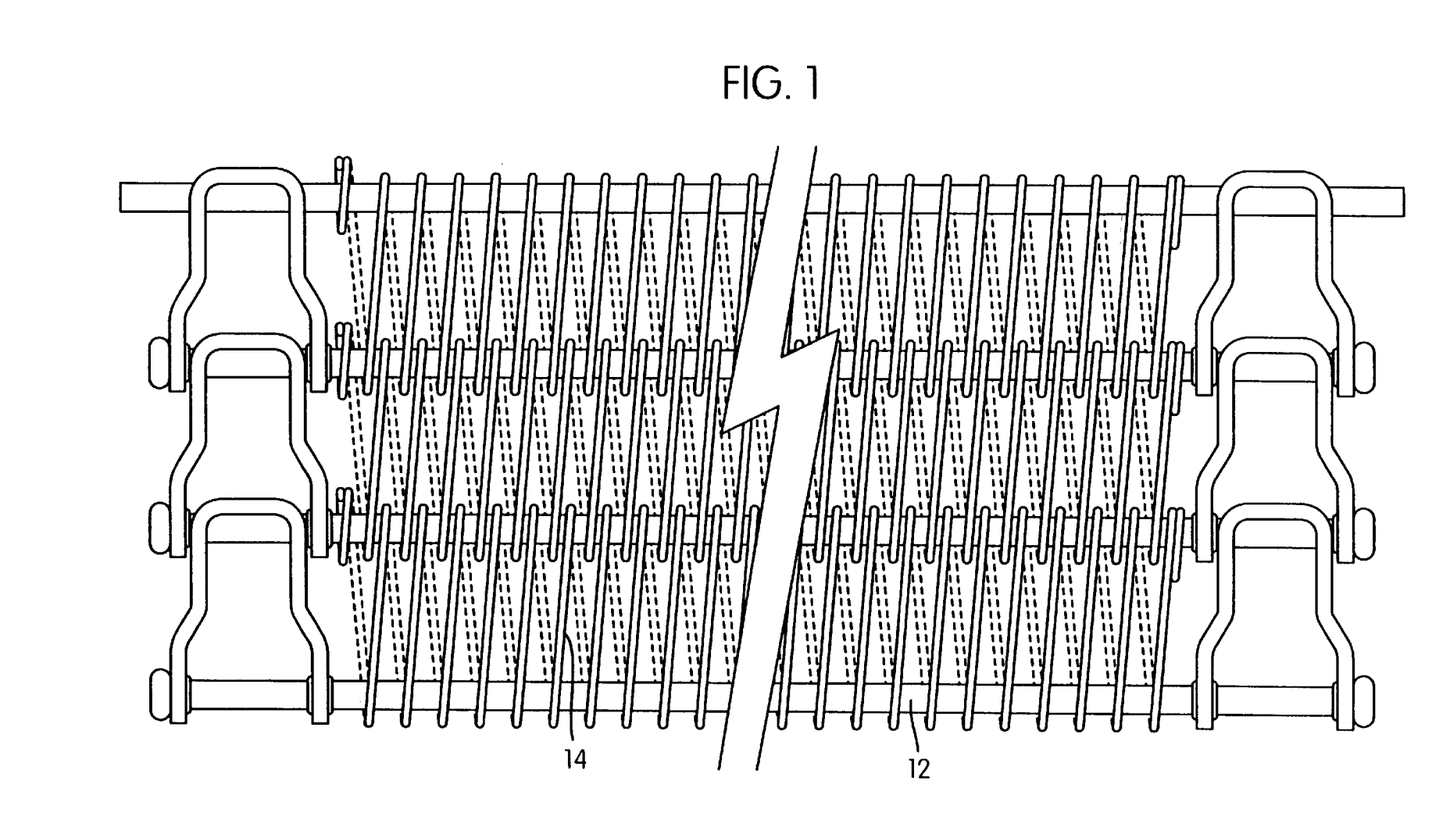
FIG. 1 is a top plan view of a section of the belt in accordance with the preferred embodiment of the invention shown with a metal overlay.
Figure 2:
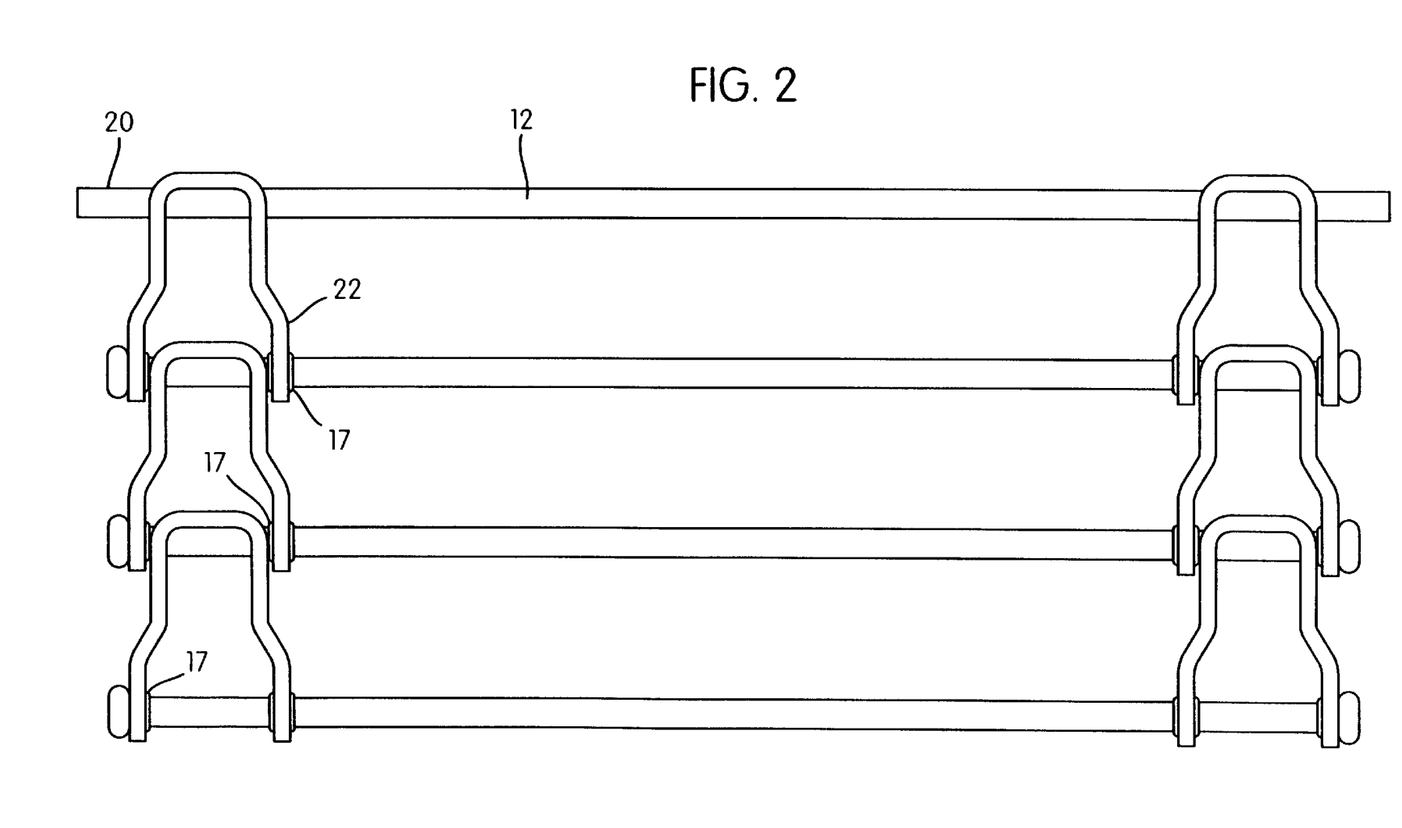
FIG. 2 is a top plan view of a section of the belt of FIG. 1, shown without an overlay.
Figure 3:
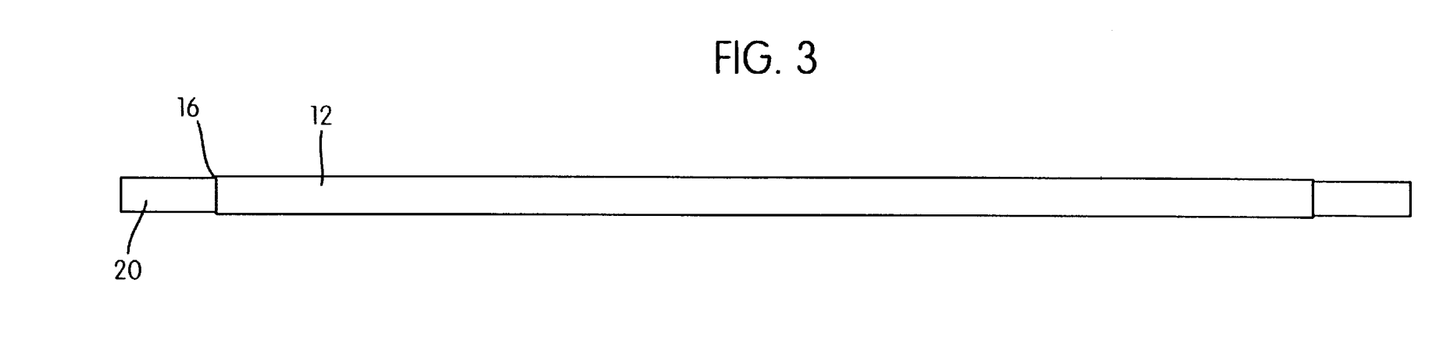
FIG. 3 is a top plan view of a rod of a belt section as shown in FIGS. 1 and 2.
Figure 4:
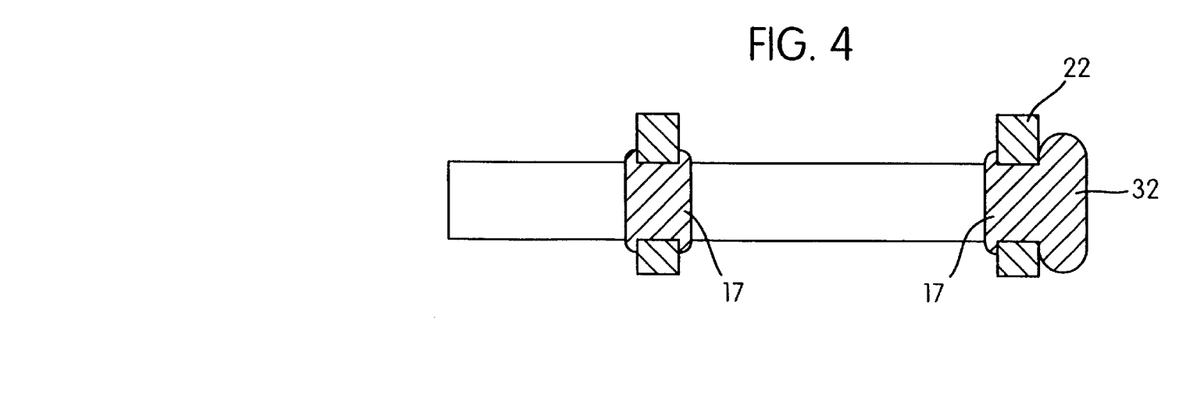
FIG. 4 is a sectional schematic drawing showing a connective link attached to a rod by formation of the button head and inside protrusions.
Figure 5:
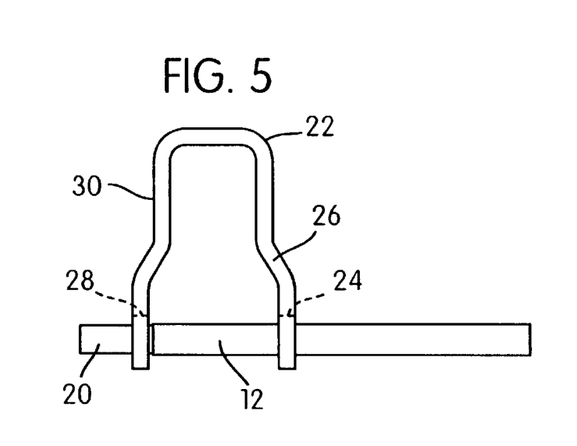
FIG. 5 is a detailed top plan view of a connective link and rod assembled together.
Figure 6:
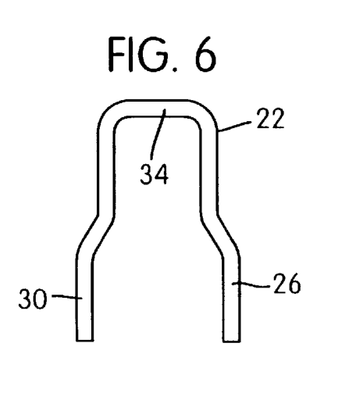
FIG. 6 is a detailed top plan view of a connective link.
Figure 7:
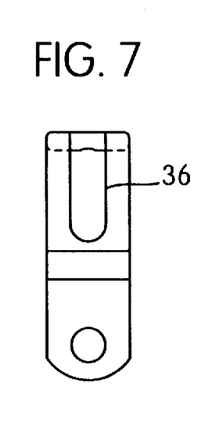
FIG. 7 is a side elevational view of one side of the link shown in FIG. 6.
Figure 8:
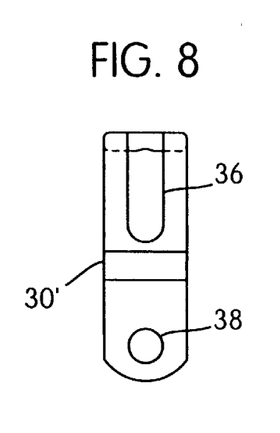
FIG. 8 is a side elevational view of an alternative configuration of the link shown in FIG. 6.

FIG. 8 illustrates an alternative embodiment of link 22 with a modified outer leg. This leg has been labeled with a prime symbol as 30' to avoid any confusion. Leg 30' has an oval aperture 38 instead of a round one which is one way of enhancing the fusion of the link to the rod. As described above, the metal rod tends to fill the aperture when the protrusion or button head is formed. By changing the shape of the aperture, the relationship of the rod and link is also changed. When the metal rod is inserted into an oval aperture and the electrodes applied, the metal rod fills the oval aperture and attaches the rod and link together so as to constrain rotational movement of the rod in the aperture. While an oval aperture is shown in the drawings, any non-circular shape to the aperture is contemplated to be within the scope of the invention. In this manner, by using a link with an out-of-round aperture on the outer leg, rotational movement of the link relative to the rod is structurally constrained without adding any manufacturing or attachment steps.

Figure 9:
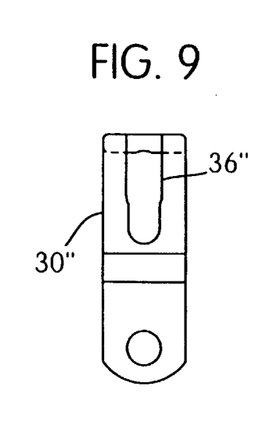
FIG. 9 is a side elevational view of another alternative configuration of the link shown in FIG. 6.

FIG. 9 shows another alternative link profile, link labeled 30", with an elongated aperture 36" which has a stepped configuration. Attachment of link 30" to a rod is shown in detail in FIG. 13 in which protrusion 17" is shown in the narrow part of aperture 36". This link profile prevents rotation of the link relative to the rod when the link-rod are in a collapsed state, but, will allow the rod to rotate within the slot when the rod is extended into the wider part of aperture 36". This is an additional structural feature that prevents rotational movement of the rod relative to the link while traversing curves or otherwise collapsed.

Although the preferred embodiments of the invention have been shown with links placed at the ends of the rods, the improved rod to link attachment by resistance welding is contemplated to be used for links placed along the central area of the rod as well. With the appropriate placement of the electrodes, the expanded rod portions or protrusions could be formed anywhere along the length of the rod. Furthermore, while the preferred embodiments are illustrated and described as conveyor belts having U-shaped links, the improved rod to link attache is contemplated to be used on conveyors with straight links to constrain a straight link on a rod and prevent lateral movement. The principle concepts of preventing lateral movement of the links, preventing rotational movement of the links and providing for selectively rotational movement of the links relative to the rod may be used in a variety of combinations. It is contemplated that a single conveyor belt may have certain sections or areas with one of these structures, while other sections on the same conveyor belt will have another one or combination of these structures.

Figure 14:
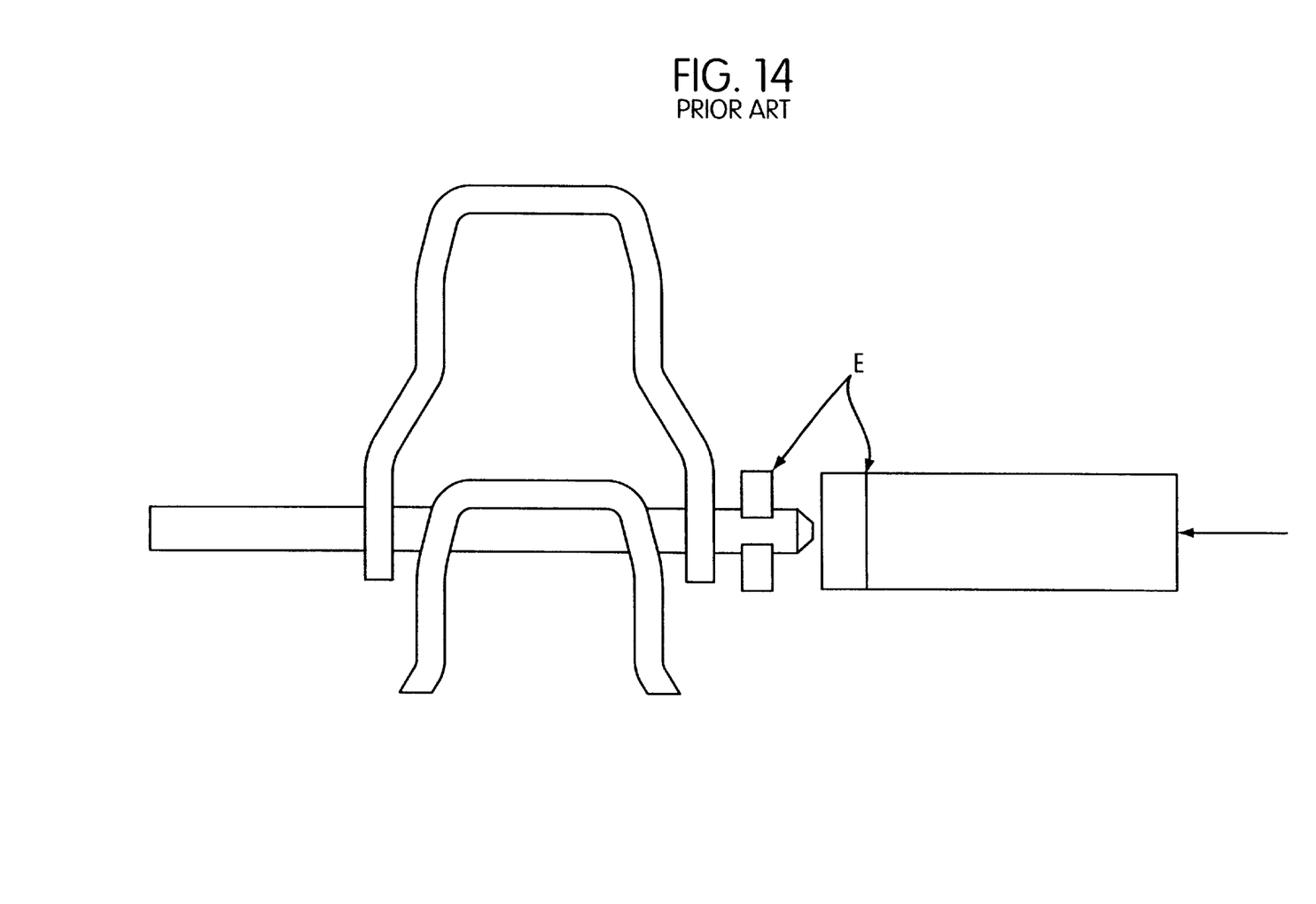
FIG. 14 is a schematic representation of the conventional application of electrodes for attaching a connective link to a rod.
Figure 15A:
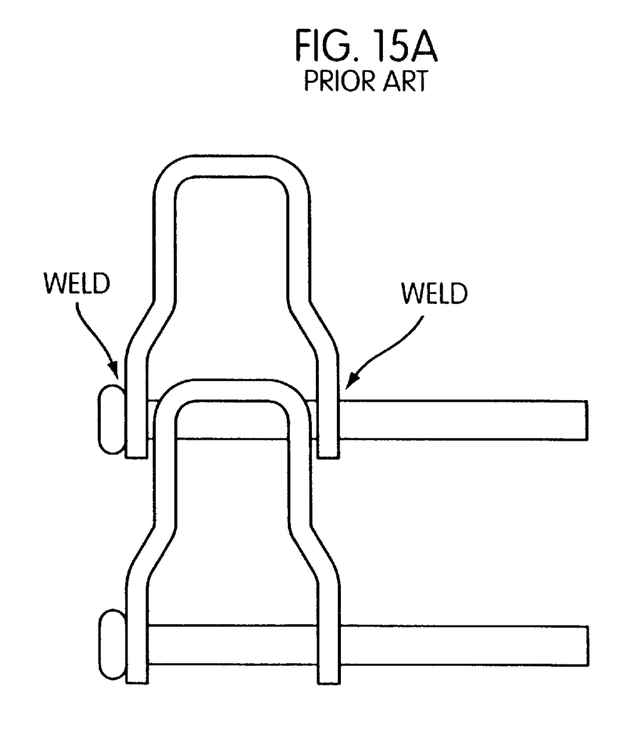
FIG. 15A is a schematic representation of the conventional welding process for attaching a connective link to a rod.
Figure 15B:
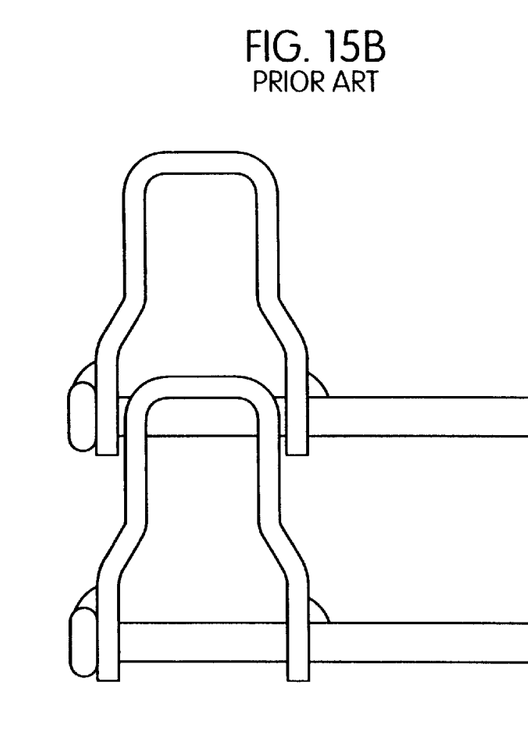
FIG. 15B is a top plan view of the links and rod of FIG. 15A shown welded together in the conventional manner.

In the prior art, FIGS. 14–15, rods did not have any structural provision to prevent lateral and rotation movement of the links thereon. One conventional method of securing the rod to the link, FIG. 14, was to place electrodes E at the outer leg of the link and apply the appropriate energy. This would form the button head to ensure that the links could not slide off of the end of the rod, but would not provide attachment of the rod and link or lateral restraint toward the center of the rod. In order to attach the rod and link together, a secondary attachment step, FIGS. 15A–15B, was to manually weld the legs of each individual link to the rod and button head to affix the link thereto. This manual welding step is laborious and time-consuming.

Eliminating the prior art weld between the links and rods also eliminates the perceived failure of the belt by the users who are attuned to look for cracked or fractured welds as a sign of failure. Thus premature repair or replacement of the belt and the attendant warranty issues are avoided.

Although the present invention has been illustrated in terms of preferred embodiments, it will be evident that numerous changes, adaptations, and modifications may be made without departing from the scope of the invention which is to be limited only by the appended claims.

What is claimed is:

1. A method of making a conveyor belt comprising repeated arrangement of transverse rods interconnected by connective links, said method comprising the steps of:
    arranging the connective links to align first apertures of one link to second apertures of another link;
    inserting rods into aligned apertures; and
    expanding the rods within one of the apertures into which it is received to fuse the rods to the links.

2. The method of claim 1, further comprising the step of forming a protrusion on the rod to constrain the link from lateral movement therealong.

3. The method of claim 1, further comprising the step of forming a button head on the ends of the rods to contain the links thereon.

4. The method of claim 1, wherein the aperture is non-circular such that said step of expanding the rod to fuse to the aperture results in a geometric rotational constraint of the rod within the aperture.

5. A method of making a conveyor belt comprising a repeating arrangement of longitudinally spaced rods each extending in a lateral direction defining first and second ends, and U-shaped connective links interconnecting the rods together, each connective link comprising inner and outer legs extending in a longitudinal direction from a lateral cross-member at a closed first end to an open second end, and defining laterally aligned first apertures on each of the legs at the closed end, and laterally aligned second apertures at the open end, said method comprising the steps of:
    arranging the connective links in a longitudinal nested fashion to align first apertures of one link with second apertures of another link;
    inserting a rod into the aligned apertures of two nestingly arranged links so that the end of the rod is disposed proximate the outer legs of a link;
    placing a first electrode at the end of the rod and a second electrode to the outside of the inner leg of the link;
    expanding the rod proximate the inner leg to thereby fuse the rod within the second aperture of the inner leg of the link;
    moving the second electrode to the inside of the link between the inner and outer legs;
    expanding the rod proximate the outer leg to thereby fuse the rod within the second aperture of the outer leg of the link.

6. The method of claim 5, wherein said first step of expanding comprises forming a protrusion on the rod proximate the inner leg to constrain the link from lateral movement therealong.

7. The method of claim 5, wherein said second step of expanding comprises forming a protrusion on the rod proximate the outer leg to constrain the link from lateral movement therealong.

8. The method of claim 7, wherein said second step of expanding also comprises forming a button head on the end of the rod to contain the link thereon.

9. The method of claim 5, wherein said second step of expanding comprises forming a button head on the end of the rod to contain the link thereon.

* * * * *